(12) United States Patent
Kinoshita et al.

(10) Patent No.: US 9,252,664 B2
(45) Date of Patent: Feb. 2, 2016

(54) DC-DC CONVERTER WITH SHORT-CIRCUIT PROTECTION

(71) Applicants: Akihiro Kinoshita, Aichi (JP); Ryo Kobayashi, Aichi (JP); Toshinori Origane, Aichi (JP)

(72) Inventors: Akihiro Kinoshita, Aichi (JP); Ryo Kobayashi, Aichi (JP); Toshinori Origane, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 0 days.

(21) Appl. No.: 14/315,484

(22) Filed: Jun. 26, 2014

(65) Prior Publication Data

US 2015/0002124 A1    Jan. 1, 2015

(30) Foreign Application Priority Data

Jun. 26, 2013 (JP) .................. 2013-133343

(51) Int. Cl.
| | | |
|---|---|---|
| G05F 1/569 | (2006.01) |
| G05F 1/571 | (2006.01) |
| G05F 1/00 | (2006.01) |
| H02H 7/00 | (2006.01) |
| H02H 9/00 | (2006.01) |
| H02M 3/158 | (2006.01) |
| H02M 1/32 | (2007.01) |

(52) U.S. Cl.
CPC ................ *H02M 3/158* (2013.01); *H02M 1/32* (2013.01)

(58) Field of Classification Search
USPC ........ 323/272–276, 285, 286; 361/18, 54–57; 363/50, 53, 54, 56.09–56.12
See application file for complete search history.

(56) References Cited

U.S. PATENT DOCUMENTS

| | | | |
|---|---|---|---|
| 7,589,940 B2 * | 9/2009 | Sawano et al. .................. 361/18 |
| 7,990,121 B2 * | 8/2011 | Kojima et al. ................. 323/282 |
| 8,058,855 B2 * | 11/2011 | Cheng ........................... 323/271 |
| 8,363,369 B2 * | 1/2013 | Lin et al. ...................... 361/91.1 |

FOREIGN PATENT DOCUMENTS

| | | |
|---|---|---|
| JP | 2005-051919 A | 2/2005 |
| JP | 2006-014491 A | 1/2006 |
| JP | 2012-157191 A | 8/2012 |

* cited by examiner

*Primary Examiner* — Timothy J Dole
*Assistant Examiner* — Gary Nash
(74) *Attorney, Agent, or Firm* — Osha Liang LLP

(57) ABSTRACT

A DC-DC converter includes a voltage converter circuit having an FET 1, a short-circuit protection FET 3 that blocks a large current from flowing in the voltage converter circuit when a short-circuit failure occurs in the FET 1 or capacitors, and a detector that detects a short-circuit failure in the FET 1 or the capacitors to turn off the FET 3. The FET 1 is connected to a power supply line and also in series to the FET 3. The capacitors are connected to the power supply line and to a connection point between the FET 1 and FET 3. The detector detects a failure on the basis of the voltage at the connection point.

20 Claims, 11 Drawing Sheets

DC-DC CONVERTER WITH SHORT-CIRCUIT PROTECTION

BACKGROUND OF THE INVENTION

1. Technical Field

The present invention relates to a DC-DC converter (DC-DC converter device) that boosts or steps down the voltage of a DC power supply to supply the voltage to a load and, in particular, a DC-DC converter including a protecting function used when a short-circuit failure occurs in the circuit.

2. Related Art

For example, a DC-DC converter is mounted on an automobile as a power supply device to supply a DC voltage to various onboard devices or circuits. In general, a DC-DC converter has a voltage converter circuit (booster circuit or step-down circuit) including a switching element, a coil, a capacitor, and the like, and switches voltages of a DC power supply at a high speed to output a boosted or stepped-down DC voltage.

In the DC-DC converter, a large current flows in the circuit due to an abnormality such as a short circuit, and the large current may break down a circuit element. Thus, a protection circuit to prevent a circuit element from being broken down by a large current in an abnormal state is conventionally disposed. Japanese Unexamined Patent Publication No. 2005-51919, Japanese Unexamined Patent Publication No. 2006-14491, and Japanese Unexamined Patent Publication No. 2012-157191 (will be described later) show a power supply device including the protection circuit.

In Japanese Unexamined Patent Publication No. 2005-51919, an overvoltage protection FET (field effect transistor), a reverse connection protection FET, and a voltage detection circuit that detects a voltage of a DC power supply are disposed. When a voltage detected by the voltage detection circuit exceeds a predetermined value with a power supply switch being turned on, the overvoltage protection FET is turned off to prevent the circuit element of a power conversion circuit from being broken down. When the power supply switch is turned on with the DC power supply being reversely connected, the reverse connection protection FET is turned off to prevent the circuit element of the power conversion circuit from being broken down.

In Japanese Unexamined Patent Publication No. 2006-14491, a reverse connection protection FET that is turned on when a power supply is connected in the forward direction and turned off when the power supply is connected in the reverse direction is disposed on a power supply path, and a booster circuit that boosts an output from the FET is disposed. On the basis of the output from the booster circuit, the FET is turned on. Even though the power supply voltage is low, a stable output voltage can be supplied.

In Japanese Unexamined Patent Publication No. 2012-157191, in order to prevent an element from being broken down by a large current flowing when a load on an output side is short-circuited, an overcurrent protection function that restricts a current flowing in a switching element of a booster circuit on the basis of a first reference value and a short-circuit protection function that quickly restricts the current on the basis of a second reference value larger than the first reference value are included.

SUMMARY

One or more embodiments of the present invention provide a DC-DC converter that is capable of not only cutting off a large current flowing in a voltage converter circuit in occurrence of a short-circuit failure in a switching element of a voltage converter circuit, but also cutting off a large current in occurrence of a short-circuit failure in a capacitor included in a voltage converter circuit or a filter circuit.

In accordance with one aspect of one or more embodiments of the present invention, a DC-DC converter including an input terminal to which a positive electrode of a DC power supply is connected, an output terminal to which a load is connected, a power supply line of the DC power supply extending from the input terminal to the output terminal, a voltage converter circuit that is disposed between the input terminal and the output terminal, has a first switching element having one end connected to the power supply line, and boosts or steps down a voltage of the DC power supply depending on an on/off-operation of the first switching element to supply the voltage to the load, and a capacitor having one end connected to the power supply line further includes a short-circuit protection second switching element connected in series with the first switching element on the other end side of the first switching element, and a detector that detects a short-circuit failure in the first switching element or the capacitor to turn off the second switching element. The other end of the capacitor is connected to a connection point between the first switching element and the second switching element. The detector detects a failure on the basis of the voltage at the connection point.

With this configuration, a large current flowing when a short-circuit failure occurs in the first switching element or the capacitor increases the voltage at the connection point between the first switching element and the second switching element. When the detector detects the increase in voltage, the second switching element connected in series with the first switching element is turned off. Thus, a large current caused by a short-circuit failure is cut off by the second switching element. In this manner, even though a short-circuit failure occurs in one of the first switching element and the capacitor, a circuit element arranged on a path in which a large current flows can be protected from being broken down.

In one or more embodiments of the present invention, when an input filter is disposed between the input terminal and the voltage converter circuit, the capacitor may be a noise reducing capacitor included in the input filter.

In one or more embodiments of the present invention, when an output filter is disposed between the voltage converter circuit and the output terminal, the capacitor may be a noise reducing capacitor included in the output filter.

In one or more embodiments of the present invention, the capacitor may be a smoothing capacitor that smooths a voltage switched by the first switching element and is included in the voltage converter circuit.

In one or more embodiments of the present invention, when an input filter is disposed between the input terminal and the voltage converter circuit and an output filter is disposed between the voltage converter circuit and the output terminal, the capacitor may include a noise removing first capacitor included in the input filter, a noise removing second capacitor included in the output filter, and a smoothing third capacitor that smooths a voltage switched by the first switching element and is included in the voltage converter circuit.

In one or more embodiments of the present invention, the detector may include a voltage-dividing resistor that divides the voltage at the connection point between the first switching element and the second switching element and a third switching element that is turned on/off when the voltage divided by the voltage-dividing resistor is equal to or higher than a predetermined value. In this case, the second switching element is turned off by turning on/off the third switching element.

In one or more embodiments of the present invention, the detector may include a controller that determines the presence/absence of a failure on the basis of the voltage at the detection point and outputs a control signal when the detector determines that the failure occurs, and a fourth switching element that is turned on/off on the basis of the control signal. In this case, the second switching element is turned off by turning on/off the fourth switching element.

In one or more embodiments of the present invention, the detector may include a first detector and a second detector. In this case, the first detector includes a voltage-dividing resistor that divides the voltage at the connection point and a third switching element that is turned on/off when the voltage divided by the voltage-dividing resistor is equal to or higher than a predetermined value, the second detector includes a controller that determines the presence/absence of the failure on the basis of the voltage at the connection point and outputs a control signal when the controller determines that the failure occurs, and a fourth switching element that is turned on/off on the basis of the control signal, and the second switching element may be configured to be turned off by turning on/off the third switching element in the first detector or turning on/off the fourth switching element in the second detector.

In one or more embodiments of the present invention, the DC-DC converter further includes a reverse connection protection fifth switching element that blocks a large current from flowing into the voltage converter circuit when the negative electrode of the DC power supply is connected to the input terminal. The fifth switching element may be connected in series with the second switching element and disposed between the second switching element and the ground.

According to one or more embodiments of the present invention, there can be provided a DC-DC converter that is capable of not only cutting off a large current in occurrence of a short-circuit failure in a switching element of a voltage converter circuit, but also cutting off a large current in occurrence of a short-circuit failure in a capacitor included in the voltage converter circuit or a filter circuit.

DETAILED DESCRIPTION

Figure 1:
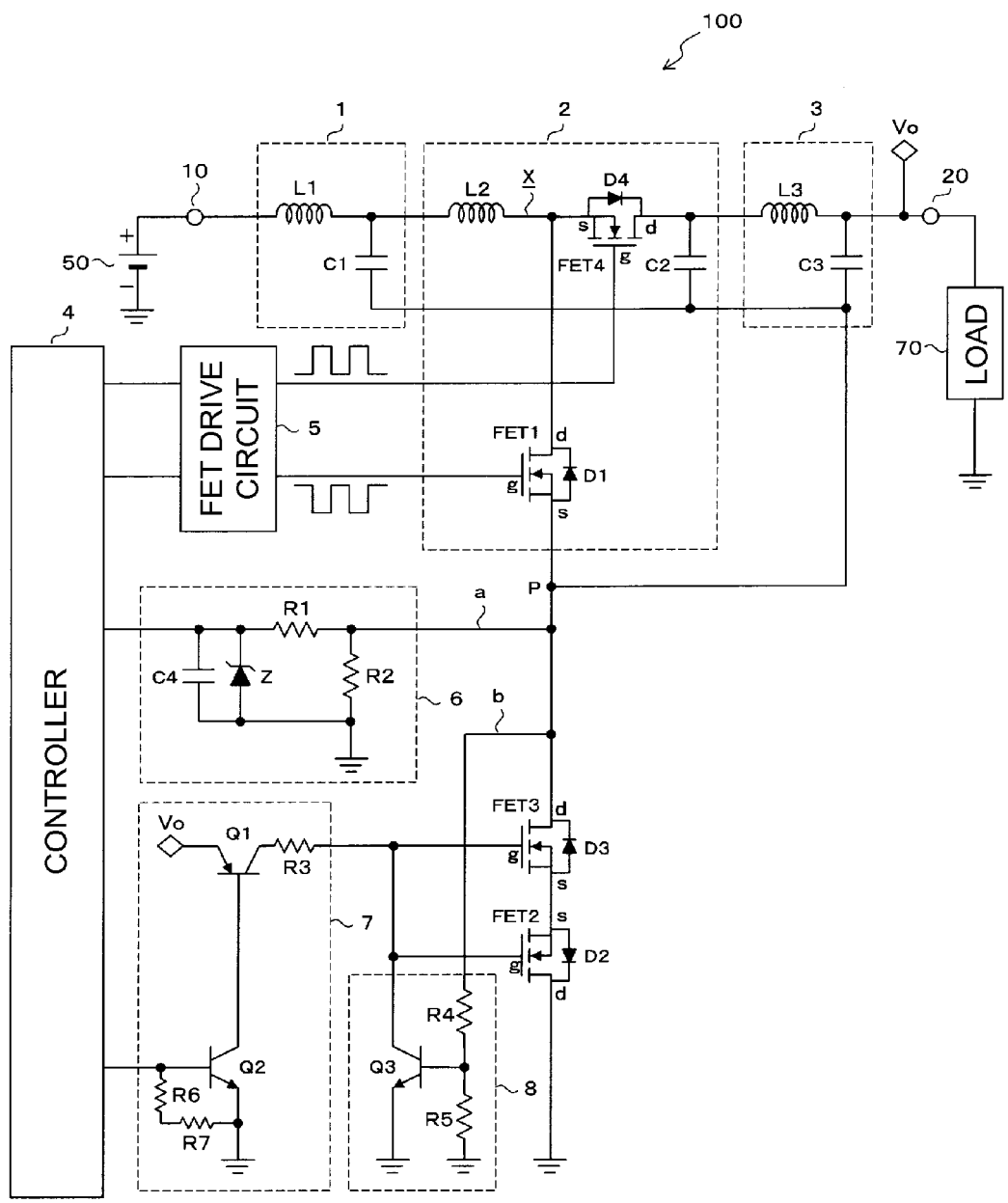
FIG. 1 is a circuit diagram of a DC-DC converter according to one or more embodiments of the present invention.

Embodiments of the present invention will be described below with reference to the accompanying drawings. The same reference numerals as in the drawings denote the same parts in the drawings.

First, the configuration of a DC-DC converter according to one or more embodiments of the present invention will be described below with reference to FIG. 1. A DC-DC converter 100 includes an input terminal 10, an input filter 1, a voltage converter circuit 2, an output filter 3, an output terminal 20, a controller 4, an FET drive circuit 5, a protection circuit 6, an FET control circuit 7, a short-circuit detection circuit 8, a reverse connection protection FET 2, and a short-circuit protection FET 3. The positive electrode of a DC power supply 50 is connected to the input terminal 10, and a load 70 is connected to the output terminal 20. The DC power supply 50 is an on-vehicle battery mounted on, for example, an automobile, and the load 70 is an ECU (Electronic Control Unit) for controlling, for example, an engine, an onboard device, or the like. A power supply line X on a positive electrode side of the DC power supply 50 extends from the input terminal 10 to the output terminal 20.

The input filter 1 is a known circuit configured by a coil L1 and a capacitor C1 to remove noise from the DC power supply 50 connected to the input terminal 10. The coil L1 configures the power supply line X partially. One end of the coil L1 is connected to the input terminal 10, and the other end is connected to one end of a coil L2 (will be described later). One end of the capacitor C1 is connected to a connection point between the coils L1 and L2 on the power supply line X. The other end of the capacitor C1 is connected to a connection point P. The connection point P is a connection point between the FET 1 and the FET 3.

The voltage converter circuit 2 is a known booster circuit including the coil L2, a capacitor C2, the switching FET 1, and a synchronous rectification FET 4 to boost the voltage of the DC power supply 50. The coil L2 and the FET 4 configure the power supply line X partially. One end of the coil L2 is connected to the other end of the coil L1, and the other end of the coil L2 is connected to a source s of the FET 4. A drain d of the FET 4 is connected to one end of a coil L3 (will be described later), and a gate g of the FET 4 is connected to the output side of the FET drive circuit 5. A drain d of the FET 1 is connected to a connection point between the coil L2 and the FET 4 on the power supply line X. A source s of the FET 1 is connected to the connection point P, and a gate g of the FET 1 is connected to the output side of the FET drive circuit 5. One end of the capacitor C2 is connected to a connection point between the FET 4 and the coil L3 on the power supply line X, and the other end is connected to the connection point P.

The FET 1 is a MOSFET that is obtained by connecting a diode D1 (parasitic diode) in parallel between the source s and the drain d. The FET 4 is a MOSFET that is obtained by connecting a diode D4 (parasitic diode) in parallel between the source s and the drain d.

An output filter 3 is a known circuit including the coil L3 and a capacitor C3 to remove noise included in an output from the voltage converter circuit 2. The coil L3 configures the power supply line X partially. One end of the coil L3 is connected to the drain d of the FET 4, and the other end is connected to the output terminal 20. One end of the capacitor C3 is connected to a connection point between the coil L3 and the output terminal 20 on the power supply line X, and the other end is connected to the connection point P.

The controller 4 includes a CPU, a memory, and the like to control the operation of the DC-DC converter 100. The controller 4 performs communication with a host device (not shown). A command signal such as a boosting command from the host device is input to the controller 4.

The FET drive circuit 5 is a circuit to drive the FET 1 and the FET 4, and receives a signal from the controller 4 to output a pulse signal (PWM signal) as shown in the drawing to the gates g of the FETs. The FET 1 and the FET 4 are alternately turned on/off with a pulse given by the FET drive circuit 5. More specifically, the FET 4 is turned off when the FET 1 is turned on, and the FET 1 is turned off when the FET 4 is turned on.

The protection circuit 6 includes resistors R1 and R2, a zener diode Z, and a capacitor C4. The input side of the protection circuit 6 is connected to a short-circuit failure detection line a, and the output side is connected to the controller 4. The short-circuit failure detection line a is connected to the connection point P. The protection circuit 6 is disposed to prevent an overvoltage from being applied to the controller 4 through the short-circuit failure detection line a.

The FET control circuit 7 is a circuit that on/off-controls the FET 2 and the FET 3, and includes transistors Q1 and Q2, resistors R3, R6, and R7. A voltage Vo output to the output terminal 20 is supplied to the emitter of the transistor Q1. The collector of the transistor Q1 is connected to the gate g of the FET 3 and the gate g of the FET 2 through the resistor R3. The base of the transistor Q1 is connected to the collector of the transistor Q2. The emitter of the transistor Q2 is connected to the ground, and the base thereof is connected to the controller 4. The resistors R6 and R7 are disposed across the base and the emitter of the transistor Q2.

The short-circuit detection circuit 8 is a circuit that detects a short-circuit failure in the FET 1, and includes a transistor Q3 and resistors R4 and R5. The collector of the transistor Q3 is connected to the gate g of the FET 3 and the gate g of the FET 2. The emitter of the transistor Q3 is connected to the ground. The base of the transistor Q3 is connected to a connection point between the resistors R4 and R5. The resistors R4 and R5 configure voltage-dividing resistors that divide a voltage at the connection point P. One end of the resistor R4 is connected to the connection point P through a short-circuit failure detection line b, and the other end is connected to one end of the resistor R5. The other end of the resistor R5 is connected to the ground.

The FET 2 is a reverse connection protection MOSFET that is obtained by connecting a diode D2 (parasitic diode) in parallel between the source s and the drain d. The FET 3 is a short-circuit protection MOSFET that is obtained by connecting a diode D3 (parasitic diode) in parallel between the source s and the drain d.

The FET 1, the FET 2, and the FET 3 are connected in series between the power supply line X and the ground. More specifically, the drain d of the FET 1 is connected to the power supply line X, and the source s is connected to the drain d of the FET 3. The source s of the FET 3 is connected to the source of the FET 2, and the drain d of the FET 2 is connected to the ground. Thus, the FET 3 is connected in series with the FET 1 on the source s side of the FET 1, and the FET 2 is connected in series with the FET 3 on the source s side of the FET 3. The diode D1 of the FET 1 and the diode D3 of the FET 3 are connected to the DC power supply 50 in a reverse direction, and the diode D2 of the FET 2 is connected to the DC power supply 50 in a forward direction.

In the above configuration, the FET 1 is an example of the "first switching element" in one or more embodiments of the present invention, and the FET 3 is an example of the "second switching element". The transistor Q3 is an example of the "third switching element" in one or more embodiments of the present invention, and the transistor Q1 is an example of the "fourth switching element". The FET 2 is an example of the "fifth switching element" in one or more embodiments of the present invention. The capacitor C1 is an example of the "first capacitor" in one or more embodiments of the present invention, the capacitor C3 is an example of the "second capacitor", and the capacitor C2 is an example of the "third capacitor".

The short-circuit failure detection line b and the short-circuit detection circuit 8 are examples of the "detector" and the "first detector" in one or more embodiments of the present invention. The short-circuit failure detection line a, the controller 4, and the FET control circuit 7 are examples of the "detector" and the "second detector" in one or more embodiments of the present invention.

An operation of the DC-DC converter 100 having the above configuration will be described below.

Figure 2:
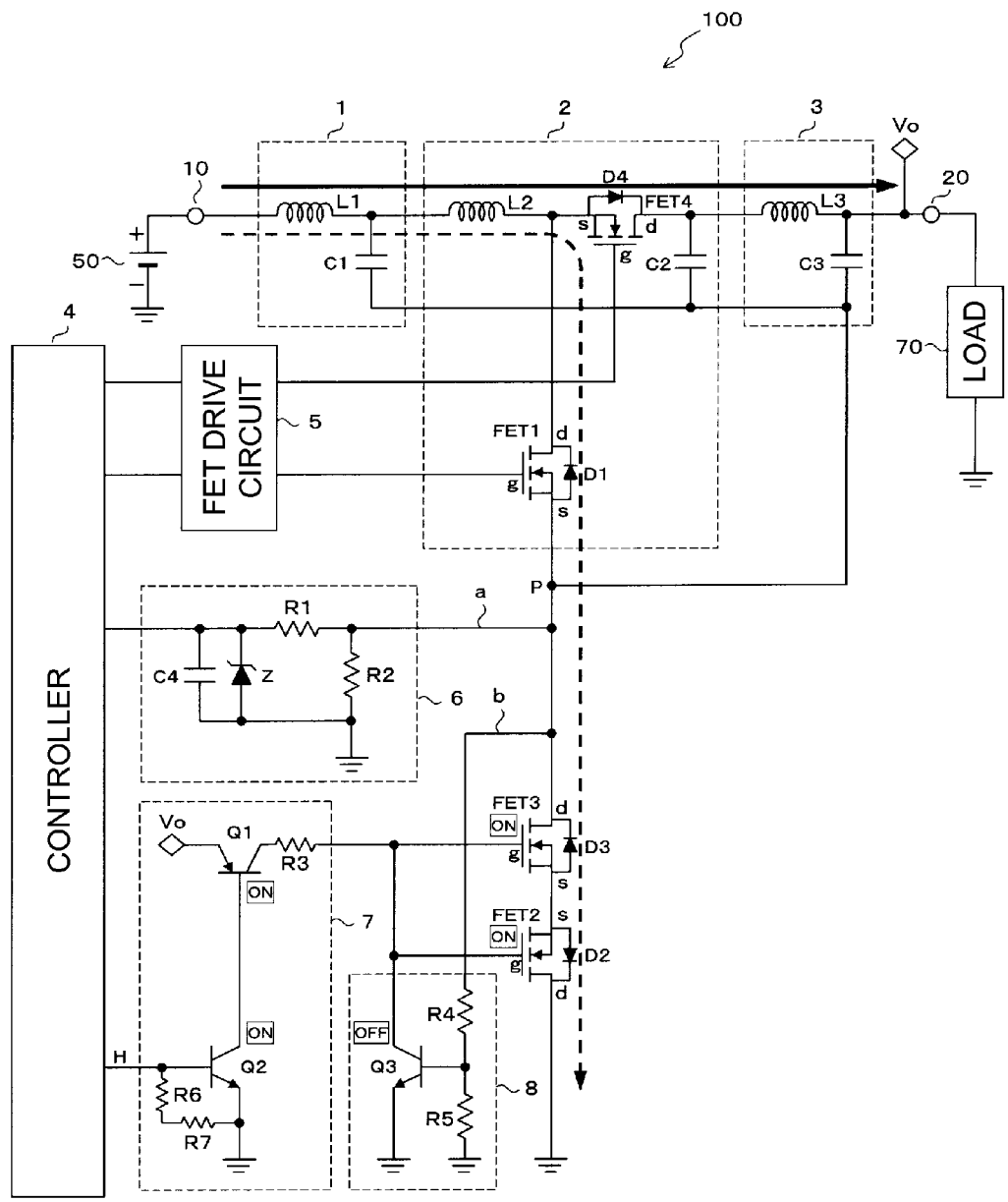
FIG. 2 is a circuit diagram showing a current path in a normal state.

An operation in a normal state will be described first with reference to FIG. 2. When a host device (not shown) gives a boosting command to the controller 4, the controller 4 outputs a drive signal to the FET drive circuit 5. In response to the drive signal, the FET drive circuit 5 generates a pulse signal (see FIG. 1), and the pulse signal is output to the gates g of the FET 1 and the FET 4. The controller 4 outputs an H (high) level control signal to the FET control circuit 7. With the H level signal, the transistor Q2 of the FET control circuit 7 is turned on, and the transistor Q1 is also turned on. For this reason, since the voltage Vo is given to the gates g of the FET 2 and the FET 3 through the transistor Q1, both the FET 2 and the FET 3 are turned on. In a normal operation, the FET 2 and the FET 3 are kept in an always-on state. On the other hand, the transistor Q3 is in an off state.

The FET 1 and the FET 4, as described above, are alternately turned on/off with a pulse signal from the FET drive circuit 5. In FIG. 2, a solid thick arrow shows a current path obtained when the FET 4 is turned on, and a broken-line thick arrow shows a current path obtained when the FET 1 is turned on. With the on/off-operations of the FET 1 and the FET 4, the voltage of the DC power supply 50 input to the voltage converter circuit 2 is switched through the input filter 1 to generate a high voltage at the coil L2. The high voltage is rectified with the diode D4 of the FET 4, smoothed with the capacitor C2, and supplied to the load 70 as a boosted DC voltage through the output filter 3.

An operation performed when the DC power supply 50 is reversely connected will be described below with reference to FIG. 3.

Figure 3:
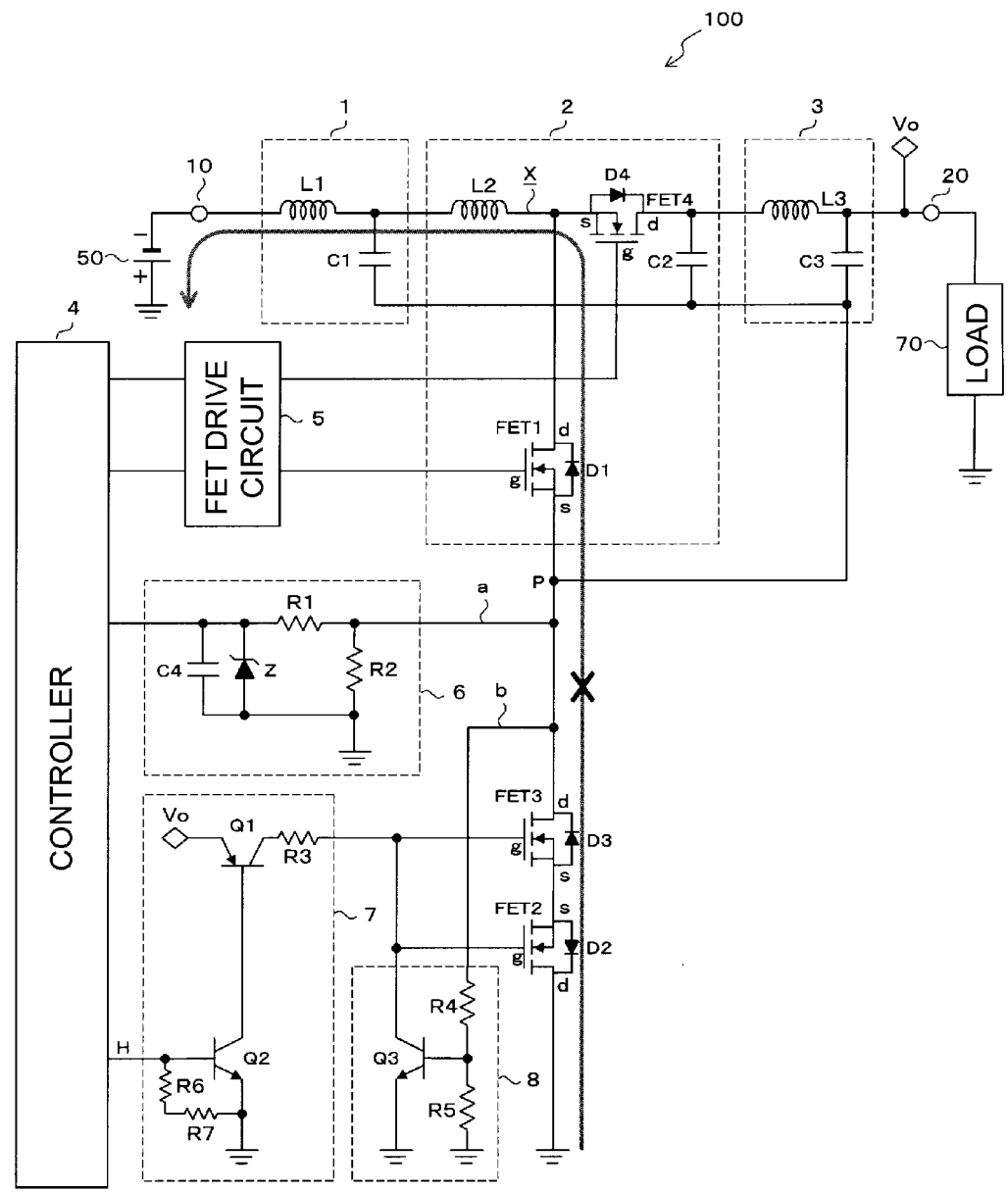
FIG. 3 is a circuit diagram for explaining current cutting-off in a reverse connection state of a DC power supply.

As shown in FIG. 3, when the negative electrode and the positive electrode of the DC power supply 50 are connected to the input terminal 10 and the ground, respectively, if the reverse connection protection FET 2 is not disposed, a large current as shown in a thick arrow flows. This is because the diodes D1 and D3 are connected in a forward direction with respect to the DC power supply 50, and a current flows through the diodes D1 and D3 even though the FET 1 and the FET 3 are in an off state. However, when the reverse connection protection FET 2 is disposed, the diode D2 of the FET 2 is connected in a reverse direction with respect to the DC power supply 50, and the current path as indicated by the thick arrow is not formed. In this manner, in the reverse connection of the DC power supply 50, the circuit element in the current path can be prevented from being broken.

An operation performed when a short-circuit failure occurs in the FET 1 of the voltage converter circuit 2 will be described below with reference to FIG. 4 to FIGS. 8A and 8B.

When a short-circuit failure occurs in the FET 1, the conductive state between the source s and the drain d of the FET 1 is fixed, and the FET 1 is in an always-on state. Thus, since all the FET 1 to FET 3 are turned on, as indicated by a thick arrow in FIG. 4, a large current flows in a path expressed by the positive electrode of the DC power supply 50→the coil L1→the coil L2→the FET 1→the FET 3→the FET 2→the ground→the negative electrode of the DC power supply 50. With the large current, a potential at the connection point P rises.

In this case, a current flowing in the path is given by 10, and resistances of the FET 2 and the FET 3 in an on state are given by r2 and r3, respectively. In this case, a voltage Vp appearing at the connection point P is given by $$Vp = Io \cdot (r2 + r3).$$

The voltage Vp is given to the short-circuit detection circuit 8 through the short-circuit failure detection line b. In the short-circuit detection circuit 8, the voltage Vp is divided by a voltage-dividing circuit including the resistors R4 and R5. Thus, the voltage divided by the resistor R4 and the resistor R5 is applied to the base of the transistor Q3. A base voltage Vb of the transistor Q3 obtained at this time is given by $$Vb = Vp \cdot R5 / (R4 + R5).$$

Figure 5:
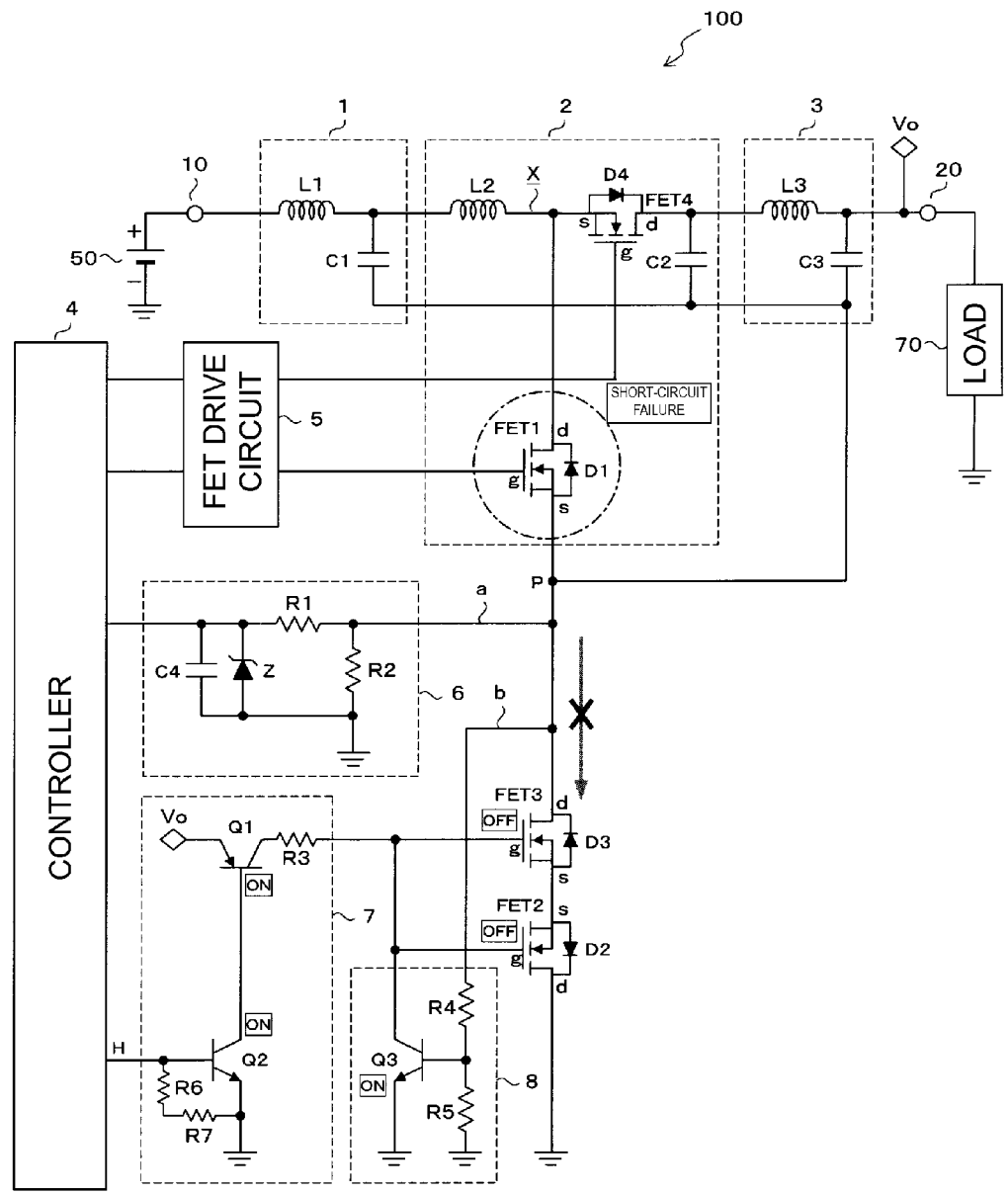
FIG. 5 is a circuit diagram for explaining current cutting-off in occurrence of a short-circuit failure.

Since the voltage Vb is set to be equal to or higher than a base voltage required to turn on the transistor Q3, as shown in FIG. 5, the transistor Q3 is turned on. As a result, the gates g of the FET 2 and the FET 3 are connected to the ground through the transistor Q3. Thus, both the FET 2 and the FET 3 are turned off due to a decrease in gate voltage.

In this state, the diode D2 of the FET 2 is connected in a forward direction with respect to the DC power supply 50, and the diode D3 of the FET 3 is connected in a reverse direction with respect to the DC power supply 50. Thus, a current path extending from the positive electrode of the DC power supply 50 to the ground through the FET 1 is not formed, and a large current generated by a short-circuit failure in the FET 1 is cut off by the FET 3 (and the diode D3).

In this manner, a short-circuit failure occurs in the FET 1 of the voltage converter circuit 2, the voltage Vp at the connection point P increases to turn on the transistor Q3, and the FET 3 is turned off. Thus, the large current flowing due to the short-circuit failure can be cut off by the FET 3. For this reason, in occurrence of a short-circuit failure in the FET 1, the current element disposed on the path in which a large current flows can be protected from being broken down.

Figure 7:
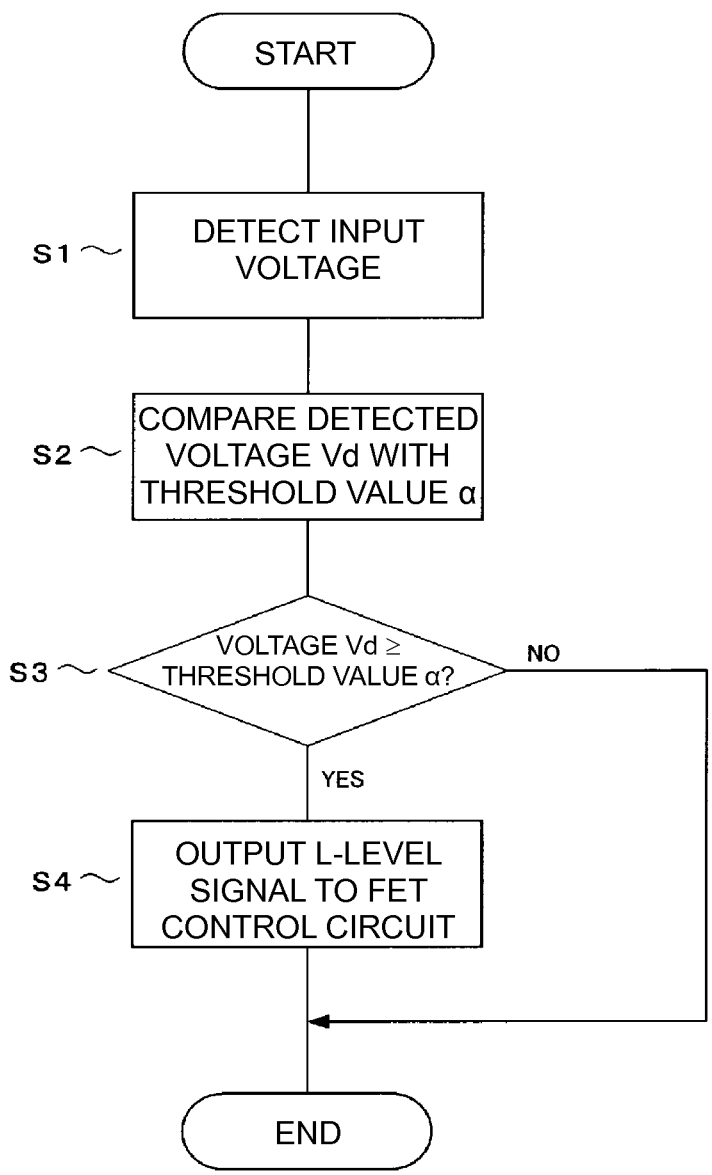
FIG. 7 is a flow chart showing an operation of a controller.

On the other hand, the voltage Vp at the connection point P is also given to the controller 4 through the short-circuit failure detection line a and the protection circuit 6. The controller 4, on the basis of the voltage Vp, determines the presence/absence of a short-circuit failure in the FET 1. An operation of the controller 4 will be described below with reference to the flow chart in FIG. 7. The steps in FIG. 7 are repetitively executed in a prescribed cycle by the CPU of the controller 4.

The voltage Vd depending on the voltage Vp at the connection point P is input to the controller 4 through the short-circuit failure detection line a. The controller 4 detects the voltage Vd in step S1. The controller 4, in step S2, compares the detected voltage Vd with a threshold value α. The threshold value α is set in a memory arranged in the controller 4 in advance. The controller 4, in step S3, determines whether the voltage Vd is the threshold value α or higher.

Figure 6:
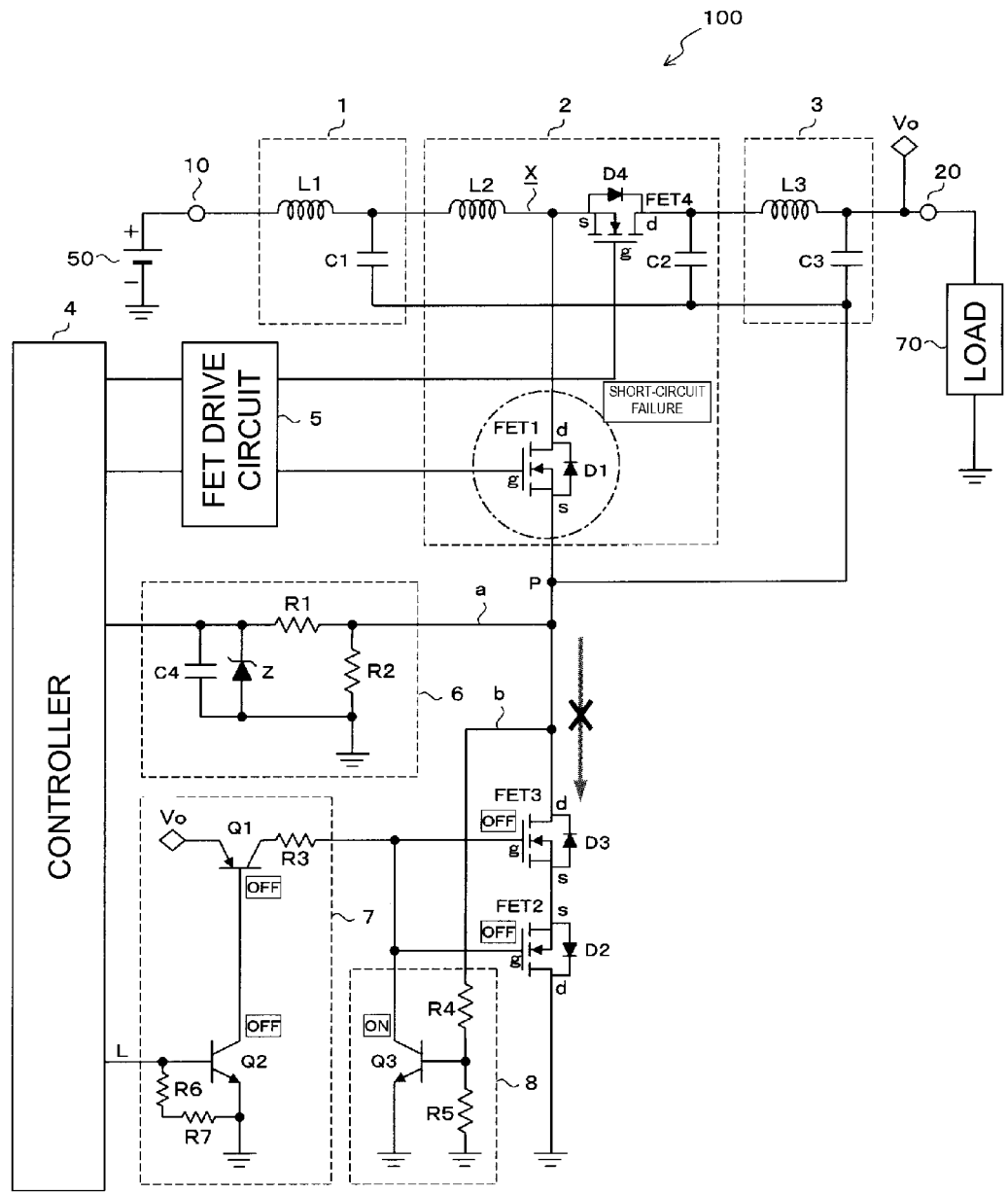
FIG. 6 is a circuit diagram for explaining current cutting-off in occurrence of a short-circuit failure.
Figure 8A:
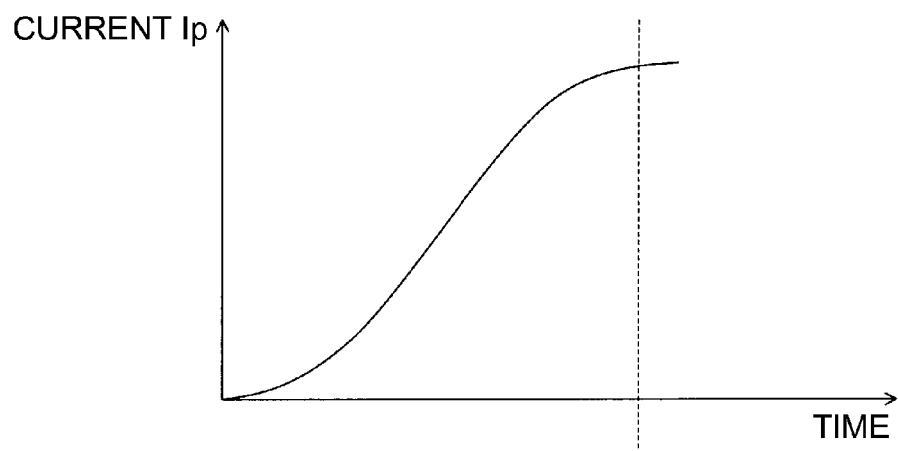
FIGS. 8A and 8B are graphs showing changes in current and voltage in occurrence of a short-circuit failure.
Figure 8B:
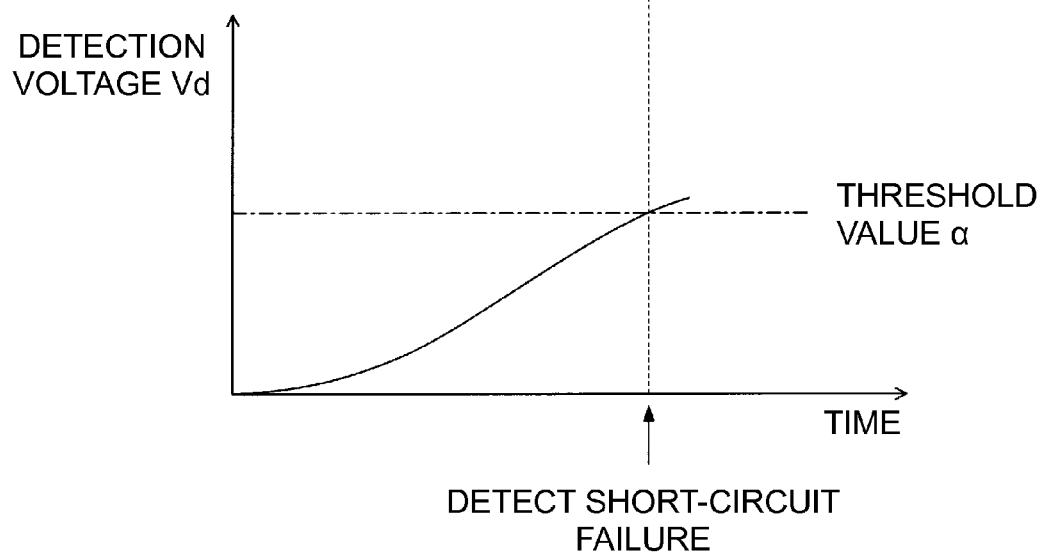

When a short-circuit failure occurs in FET 1, as shown in FIG. 8A, a current Ip at the connection point P increases, and the voltage Vp rises. As a result, the voltage Vd detected by the controller 4 also increases accordingly as shown in FIG. 8B. When the determination result in step S3 shows that the voltage Vd is the threshold value α or higher (step S3; YES), the controller 4 determines that a short-circuit failure occurs in the FET 1. The controller 4, in the next step S4, as shown in FIG. 6, outputs an L- (Low) level control signal to the FET control circuit 7. More specifically, the control signal given to the FET control circuit 7 by the controller 4 is switched from an H-level signal to an L-level signal. On the other hand, as a result of the determination in step S3, when the voltage Vd is lower than the threshold value α (step S3; NO), the process is ended without executing step S4.

By the L-level signal output from the controller 4 in step S4, as shown in FIG. 6, the transistor Q2 of the FET control circuit 7 is turned off, and the transistor Q1 is also turned off. At this point of time, since the transistor Q3 in the short-circuit detection circuit 8 is turned on, the FET 2 and the FET 3 have been turned off already. Thus, even though the transistor Q1 is turned off, the states of the FET 2 and the FET 3 do not change. However, when the transistor Q3 in the short-circuit detection circuit 8 is not turned on with some cause, the transistor Q1 is turned off to make it possible to turn off the FET 2 and the FET 3.

In this manner, in the embodiment, the first detector including the short-circuit failure detection line b and the short-circuit detection circuit 8 and the second detector including the short-circuit failure detection line a, the controller 4, and the FET control circuit 7 are disposed to duplicate the means for detecting a short-circuit failure in the FET 1. Since the first detector includes only hardware (the transistor Q3 and the resistors R4 and R5), a time required to detect a short-circuit failure is short. In contrast to this, since the second detector requires software processing performed by the CPU in the controller 4, a time required to detect a short-circuit failure is longer than that required in the first detector. Thus, when a short-circuit failure occurs in the FET 1, first, the short-circuit detection circuit 8 in the first detector operates to turn off the FET 2 and the FET 3. Thereafter, the controller 4 and the FET control circuit 7 in the second detector operate to perform a backup operation in an abnormal state of the short-circuit detection circuit 8. For this reason, in occurrence of a short-circuit failure, the reliability of cutting-off of a large current can be improved.

An operation performed when a short-circuit failure occurs in the capacitors C1 to C3 will be described below with reference to FIG. 9 to FIG. 11. When a short-circuit failure occurs in the capacitors C1 to C3, DC resistances of the capacitors become almost zero.

Figure 9:
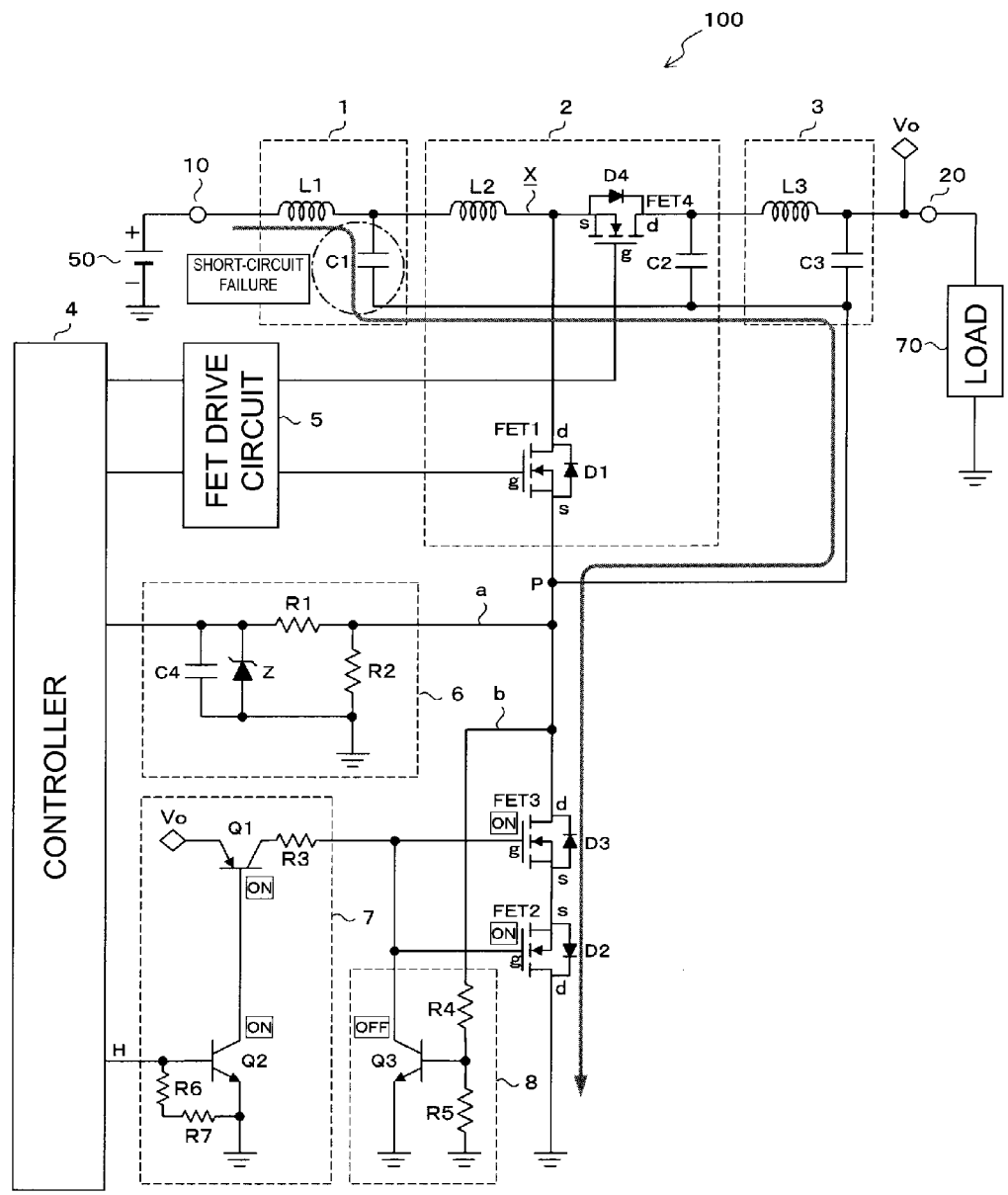
FIG. 9 is a circuit diagram showing a current path when a short-circuit failure occurs in a capacitor of an input filter.

Thus, when a short-circuit failure occurs in the capacitor C1 of the input filter 1, as indicated by a thick arrow in FIG. 9, a large current flows in a path expressed by the positive electrode of the DC power supply 50→the coil L1→the capacitor C1→the FET 3→the FET 2→the ground→the negative electrode of the DC power supply 50. With the large current, a potential at the connection point P rises. Thus, by the same principle as that in occurrence of a short-circuit failure in the FET 1, both the FET 2 and the FET 3 are turned off. For this reason, a large current generated due to the short-circuit failure in the capacitor C1 is cut off by the FET 3.

Figure 10:
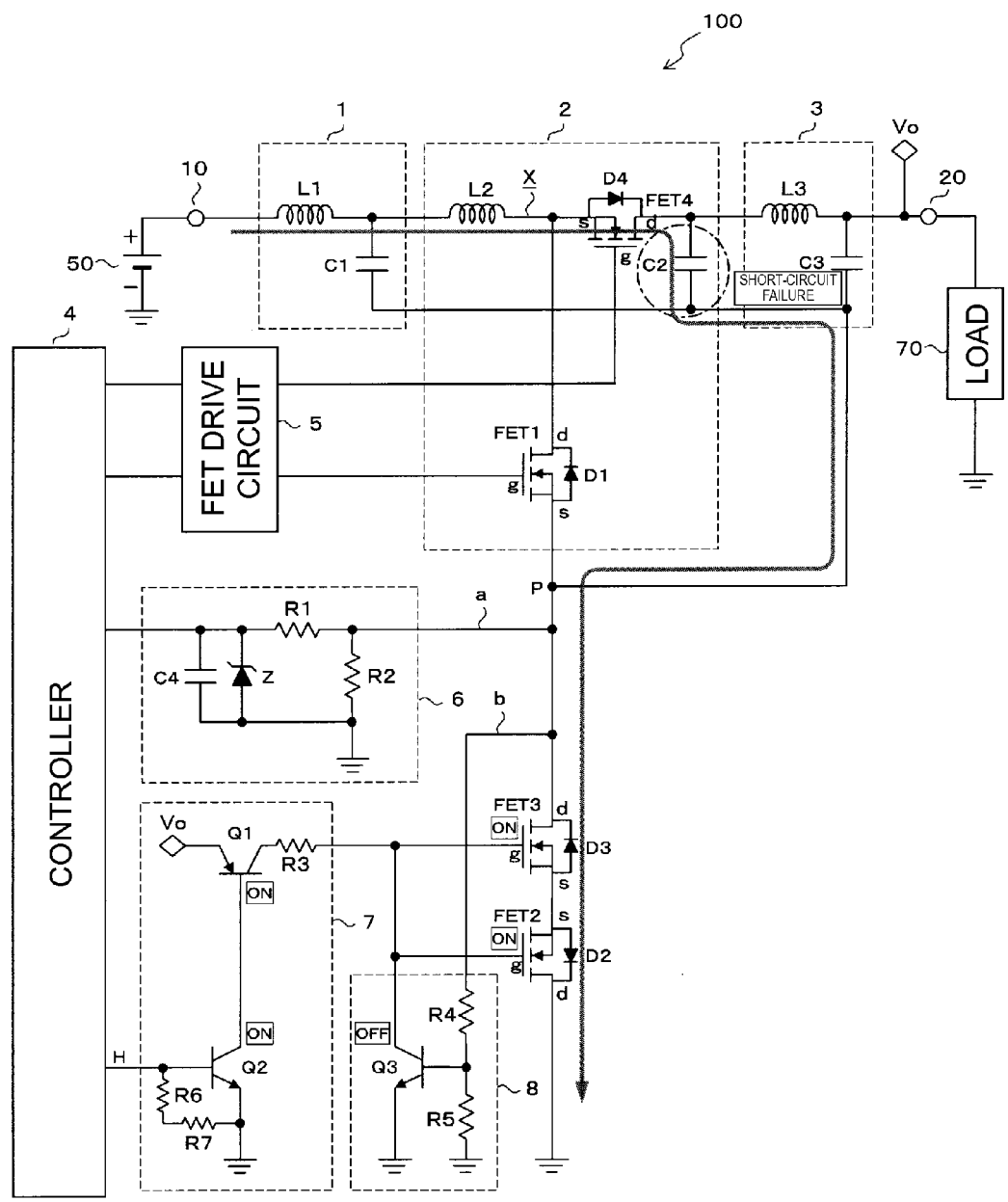
FIG. 10 is a circuit diagram showing a current path when a short-circuit failure occurs in a capacitor of a voltage converter circuit.

Thus, when a short-circuit failure occurs in the capacitor C2 of the voltage converter circuit 2, as indicated by a thick arrow in FIG. 10, a large current flows in a path expressed by the positive electrode of the DC power supply 50→the coil L1→the coil L2→the FET 4→the capacitor C2→the FET 3→the FET 2→the ground→the negative electrode of the DC power supply 50. With the large current, a potential at the connection point P rises. Thus, by the same principle as that in the case in FIG. 9, both the FET 2 and the FET 3 are turned off. For this reason, a large current generated due to the short-circuit failure in the capacitor C2 is cut off by the FET 3.

Figure 11:
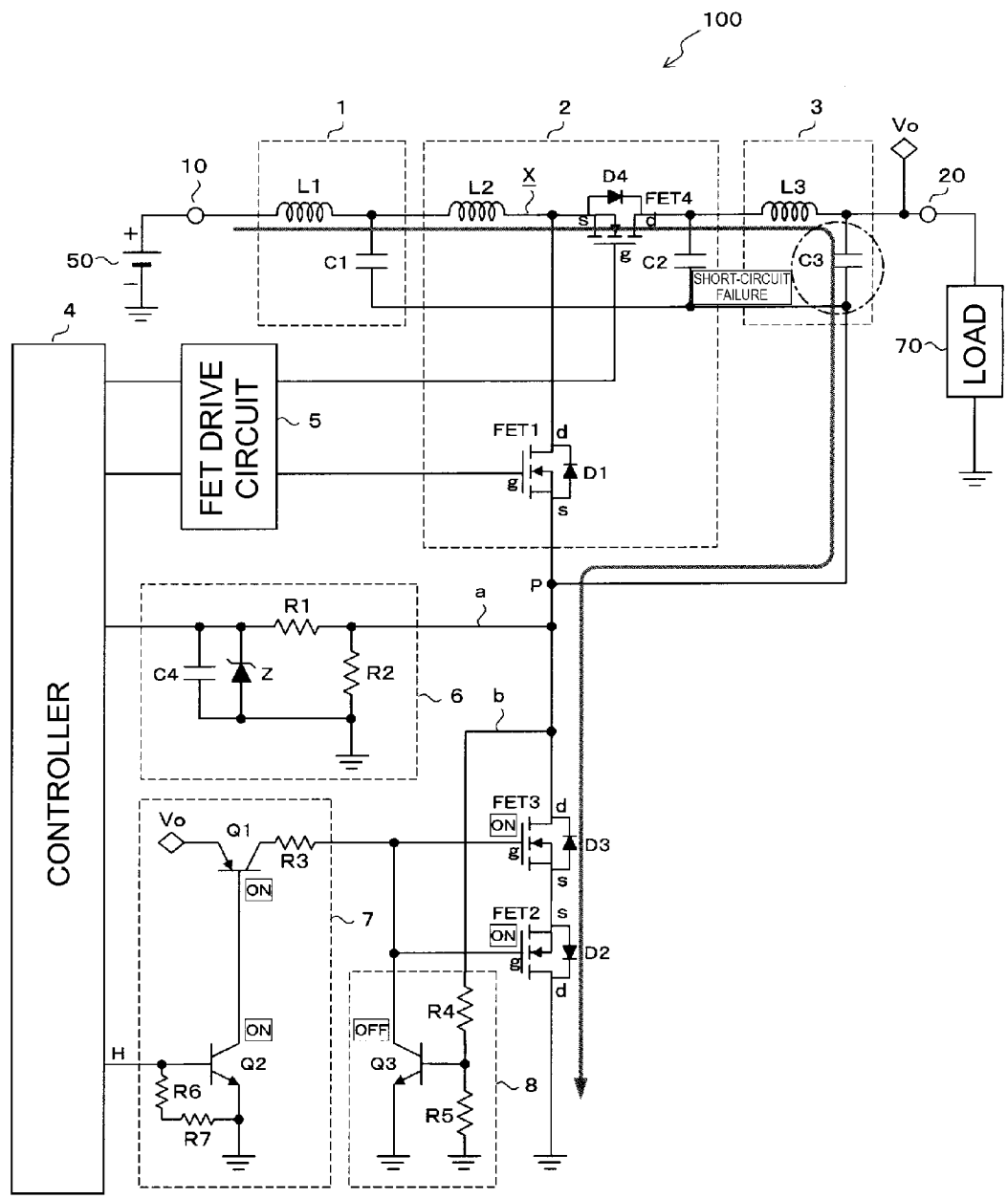
FIG. 11 is a circuit diagram showing a current path when a short-circuit failure occurs in a capacitor of an output filter.

Thus, when a short-circuit failure occurs in the capacitor C3 of the output filter 3, as indicated by a thick arrow in FIG. 11, a large current flows in a path expressed by the positive electrode of the DC power supply 50→the coil L1→the coil L2→the FET 4→the coil L3→the capacitor C3→the FET 3→The FET 2→the ground→the negative electrode of the DC power supply 50. With the large current, a potential at the connection point P rises. Thus, by the same principle as that in the case in FIG. 9, both the FET 2 and the FET 3 are turned off. For this reason, a large current generated due to the short-circuit failure in the capacitor C3 is cut off by the FET 3.

Figure 4:
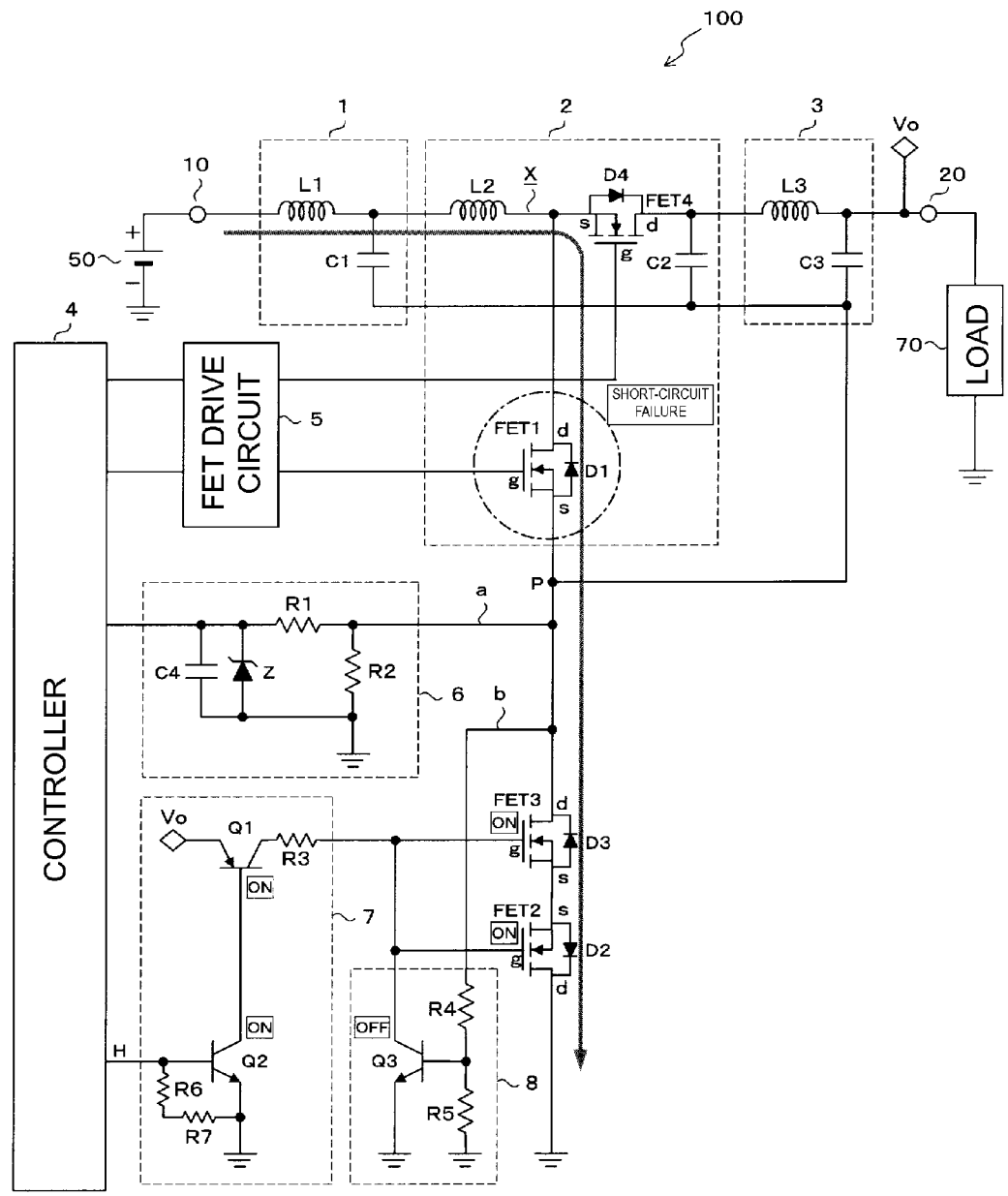
FIG. 4 is a circuit diagram showing a current path when a short-circuit failure occurs in an FET.

When short-circuit failures occur in both the FET 1 of the voltage converter circuit 2 and some (or all) of the capacitors C1 to C3, the current path indicated by the thick arrow in FIG. 4 and the current paths indicated by the thick arrows in FIG. 9 to FIG. 11 are formed. Also in this case, since the potential at the connection point P rises due to the flowing large current, the FET 3 is turned off to make it possible to cut off the large current, as a matter of course.

In this manner, in the embodiment, one ends of the capacitors C1 to C3 are connected to the power supply line X, and the other ends are connected to the connection point P between the FET 1 and the FET 3, so that the FET 3 is turned off when a voltage at the connection point P increases. Thus, not only in occurrence of a short-circuit failure in the FET 1 but also in occurrence of a short-circuit failure in the capacitors C1 to C3, the large current can be cut off by the same FET 3.

In one or more embodiments of the present invention, various modifications can be employed. For example, in the embodiments described above, when a short-circuit failure occurs in the FET 1 or the capacitors C1 to C3, the transistor Q3 of the short-circuit detection circuit 8 is turned on to turn off the FET 2 and the FET 3 so as to cut off a large current. In place of this, a circuit configuration in which, when a short-circuit failure occurs in the FET 1 or the capacitors C1 to C3, the transistor of the short-circuit detection circuit 8 is turned off to turn off the FET 2 and the FET 2 may be employed.

In one or more embodiments, the transistor Q1 of the FET control circuit 7 is turned on to turn on the FET 2 and the FET 3. However, a circuit configuration in which the transistor of the FET control circuit 7 is turned off to turn on the FET 2 and the FET 3 may be employed. In this case, when a short-circuit failure occurs in the FET 1 or the capacitors C1 to C3, the transistor of the FET control circuit 7 is turned on.

In one or more embodiments, in the voltage converter circuit 2, the synchronous rectification FET 4 having the diode D4 is disposed to rectify a high voltage generated in the coil L2. However, a normal diode may be used in place of the FET 4.

In one or more embodiments, the FET is used as a switching element. However, a transistor may be used in place of the FET. Similarly, in place of the transistors Q1 to Q3 in the embodiment, FETs may be used. Furthermore, in place of the FET, a switching element such as an IGBT (Insulating Gate Bipolar Transistor) may be used.

In one or more embodiments, between the connection point P and the ground, the FET 2 is disposed on the ground side, and the FET 3 is disposed on the power supply side. However, the FET 2 may be disposed on the power supply side, and the FET 3 may be disposed on the ground side. Also in this case, since the FET 1 is connected through the FET 3 and the FET 2, the connection point P is not different from the connection point between the FET 1 and the FET 3.

In one or more embodiments, as a means for detecting a short-circuit failure in the FET 1 or the capacitors C1 to C3, the first detector including the short-circuit failure detection line b and the short-circuit detection circuit 8 and the second detector including the short-circuit failure detection line a, the controller 4, and the FET control circuit 7 are disposed. However, only one of the first detector and the second detector may be disposed. When only the second detector is disposed, the transistor Q1 of the FET control circuit 7 is turned off to turn off the FET 2 and FET 3, and a large current is cut off. Also in this case, such a circuit configuration that the FET 2 and the FET 3 are turned off by turning on the transistor of the FET control circuit 7 may be employed.

In one or more embodiments, although the voltage converter circuit 2 is configured by the booster circuit, depending on the specifications of a converted voltage, the voltage converter circuit 2 may be configured by a step-down circuit.

In one or more embodiments, the DC-DC converter 100 to be mounted on a vehicle is exemplified. However, one or more embodiments of the present invention can also be applied to a DC-DC converter used for applications other than the above application.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A DC-DC converter comprising:
   an input terminal to which a positive electrode of a DC power supply is connected;
   an output terminal to which a load is connected;
   a power supply line of the DC power supply extending from the input terminal to the output terminal;
   a voltage converter circuit that is disposed between the input terminal and the output terminal, has a first switching element having one end connected to the power supply line, and boosts or steps down a voltage of the DC power supply depending on an on/off-operation of the first switching element to supply the voltage to the load; and
   a capacitor having one end connected to the power supply line, and further comprising:
   a short-circuit protection second switching element connected in series with the first switching element on the other end side of the first switching element; and
   a detector that detects a short-circuit failure in the first switching element or the capacitor to turn off the second switching element, wherein
   the other end of the capacitor is connected to a connection point between the first switching element and the second switching element, and
   the detector detects a failure on the basis of a voltage at the connection point.

2. The DC-DC converter according to claim 1, further comprising
   an input filter disposed between the input terminal and the voltage converter circuit, wherein
   the capacitor is a noise removing capacitor included in the input filter.

3. The DC-DC converter according to claim 2, wherein the detector includes:
   a voltage-dividing resistor that divides the voltage at the connection point; and
   a third switching element that is turned on/off when the voltage divided by the voltage-dividing resistor is equal to or higher than a constant value, and
   the second switching element is turned off by turning on/off the third switching element.

4. The DC-DC converter according to claim 2, wherein the detector includes a first detector and a second detector, the first detector includes a voltage-dividing resistor that divides the voltage at the connection point, and a third switching element that is turned on/off when the voltage divided by the voltage-dividing resistor is equal to or higher than a predetermined value, the second detector includes a controller that determines the presence/absence of a failure on the basis of the voltage at the connection point and outputs a control signal when the second detector determines that the failure occurs, and a fourth switching element that is turned on/off on the basis of the control signal, and the second switching element is turned off by turning on/off the third switching element in the first detector or turning on/off the fourth switching element in the second detector.

5. The DC-DC converter according to claim 2, further comprising a reverse connection protection fifth switching element that blocks a large current from flowing into the voltage converter circuit when the negative electrode of the DC power supply is connected to the input terminal, wherein the fifth switching element is connected in series with the second switching element and disposed between the second switching element and the ground.

6. The DC-DC converter according to claim 1, further comprising an output filter disposed between the voltage converter circuit and the output terminal, wherein the capacitor is a noise removing capacitor included in the output filter.

7. The DC-DC converter according to claim 6, wherein the detector includes:

a voltage-dividing resistor that divides the voltage at the connection point; and a third switching element that is turned on/off when the voltage divided by the voltage-dividing resistor is equal to or higher than a constant value, and the second switching element is turned off by turning on/off the third switching element.

8. The DC-DC converter according to claim 6, wherein the detector includes a first detector and a second detector, the first detector includes a voltage-dividing resistor that divides the voltage at the connection point, and a third switching element that is turned on/off when the voltage divided by the voltage-dividing resistor is equal to or higher than a predetermined value, the second detector includes a controller that determines the presence/absence of a failure on the basis of the voltage at the connection point and outputs a control signal when the second detector determines that the failure occurs, and a fourth switching element that is turned on/off on the basis of the control signal, and the second switching element is turned off by turning on/off the third switching element in the first detector or turning on/off the fourth switching element in the second detector.

9. The DC-DC converter according to claim 6, further comprising a reverse connection protection fifth switching element that blocks a large current from flowing into the voltage converter circuit when the negative electrode of the DC power supply is connected to the input terminal, wherein the fifth switching element is connected in series with the second switching element and disposed between the second switching element and the ground.

10. The DC-DC converter according to claim 1, wherein the capacitor is a smoothing capacitor that smooths a voltage switched by the first switching element and is included in the voltage converter circuit.

11. The DC-DC converter according to claim 10, wherein the detector includes:

a voltage-dividing resistor that divides the voltage at the connection point; and a third switching element that is turned on/off when the voltage divided by the voltage-dividing resistor is equal to or higher than a constant value, and the second switching element is turned off by turning on/off the third switching element.

12. The DC-DC converter according to claim 10, wherein the detector includes a first detector and a second detector, the first detector includes a voltage-dividing resistor that divides the voltage at the connection point, and a third switching element that is turned on/off when the voltage divided by the voltage-dividing resistor is equal to or higher than a predetermined value, the second detector includes a controller that determines the presence/absence of a failure on the basis of the voltage at the connection point and outputs a control signal when the second detector determines that the failure occurs, and a fourth switching element that is turned on/off on the basis of the control signal, and the second switching element is turned off by turning on/off the third switching element in the first detector or turning on/off the fourth switching element in the second detector.

13. The DC-DC converter according to claim 10, further comprising a reverse connection protection fifth switching element that blocks a large current from flowing into the voltage converter circuit when the negative electrode of the DC power supply is connected to the input terminal, wherein the fifth switching element is connected in series with the second switching element and disposed between the second switching element and the ground.

14. The DC-DC converter according to claim 1, further comprising:

an input filter disposed between the input terminal and the voltage converter circuit; and an output filter disposed between the voltage converter circuit and the output terminal, wherein the capacitor includes:

a noise removing first capacitor included in the input filter;

a noise removing second capacitor included in the output filter; and a smoothing third capacitor that smooths a voltage switched by the first switching element and is included in the voltage converter circuit.

15. The DC-DC converter according to claim 14, wherein the detector includes:

a voltage-dividing resistor that divides the voltage at the connection point; and a third switching element that is turned on/off when the voltage divided by the voltage-dividing resistor is equal to or higher than a constant value, and the second switching element is turned off by turning on/off the third switching element.

16. The DC-DC converter according to claim 14, wherein the detector includes a first detector and a second detector, the first detector includes
a voltage-dividing resistor that divides the voltage at the connection point, and
a third switching element that is turned on/off when the voltage divided by the voltage-dividing resistor is equal to or higher than a predetermined value,
the second detector includes
a controller that determines the presence/absence of a failure on the basis of the voltage at the connection point and outputs a control signal when the second detector determines that the failure occurs, and
a fourth switching element that is turned on/off on the basis of the control signal, and
the second switching element is turned off by turning on/off the third switching element in the first detector or turning on/off the fourth switching element in the second detector.

17. The DC-DC converter according to claim 1, wherein the detector includes:
a voltage-dividing resistor that divides the voltage at the connection point; and
a third switching element that is turned on/off when the voltage divided by the voltage-dividing resistor is equal to or higher than a constant value, and
the second switching element is turned off by turning on/off the third switching element.

18. The DC-DC converter according to claim 1, wherein the detector includes:
a controller that determines the presence/absence of a failure on the basis of a voltage at the connection point and outputs a control signal when the detector determines that the failure occurs; and
a fourth switching element that is turned on/off on the basis of the control signal, and
the second switching element is turned off by turning on/off the fourth switching element.

19. The DC-DC converter according to claim 1, wherein the detector includes a first detector and a second detector, the first detector includes
a voltage-dividing resistor that divides the voltage at the connection point, and
a third switching element that is turned on/off when the voltage divided by the voltage-dividing resistor is equal to or higher than a predetermined value,
the second detector includes
a controller that determines the presence/absence of a failure on the basis of the voltage at the connection point and outputs a control signal when the second detector determines that the failure occurs, and
a fourth switching element that is turned on/off on the basis of the control signal, and
the second switching element is turned off by turning on/off the third switching element in the first detector or turning on/off the fourth switching element in the second detector.

20. The DC-DC converter according to claim 1, further comprising
a reverse connection protection fifth switching element that blocks a large current from flowing into the voltage converter circuit when the negative electrode of the DC power supply is connected to the input terminal, wherein
the fifth switching element is connected in series with the second switching element and disposed between the second switching element and the ground.

* * * * *